Jan. 20, 1953 L. E. HINDS 2,625,813
MOTORCYCLE LOCK
Filed Nov. 22, 1950 3 Sheets-Sheet 1
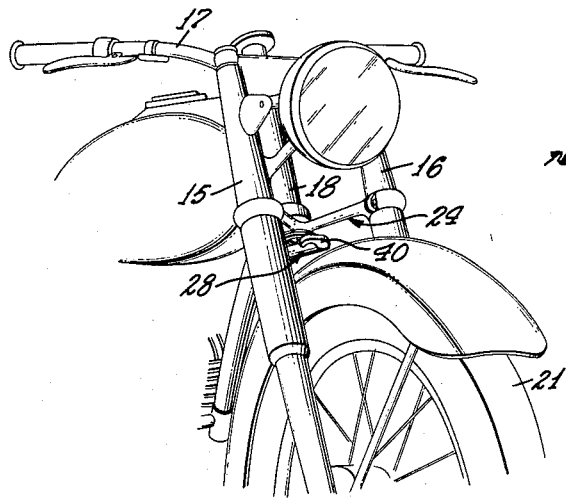
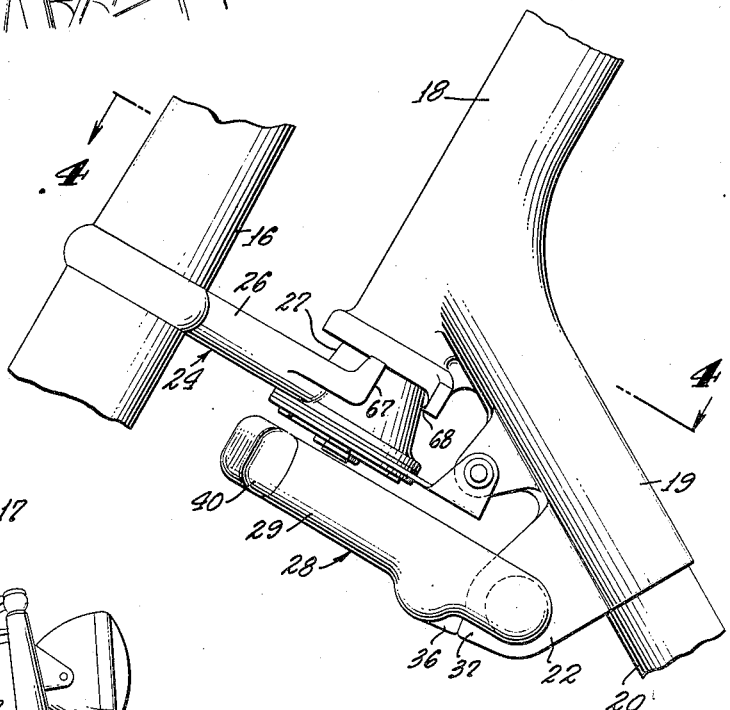
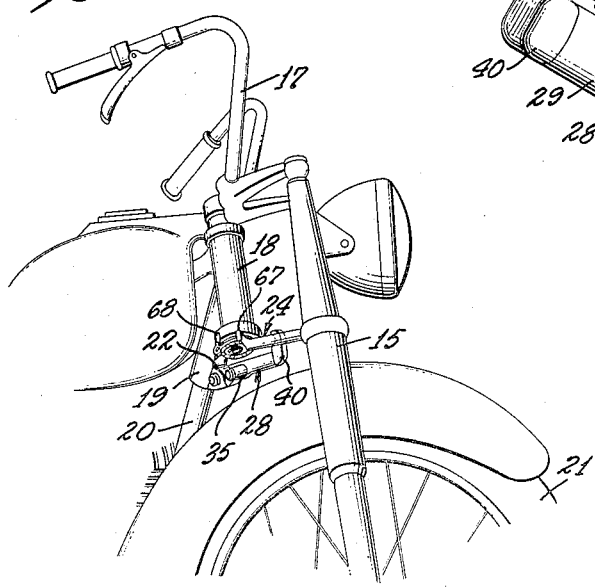
INVENTOR:
LLOYD E. HINDS.
BY George J. Smyth
ATTORNEY.

Jan. 20, 1953 L. E. HINDS 2,625,813
MOTORCYCLE LOCK
Filed Nov. 22, 1950 3 Sheets-Sheet 2
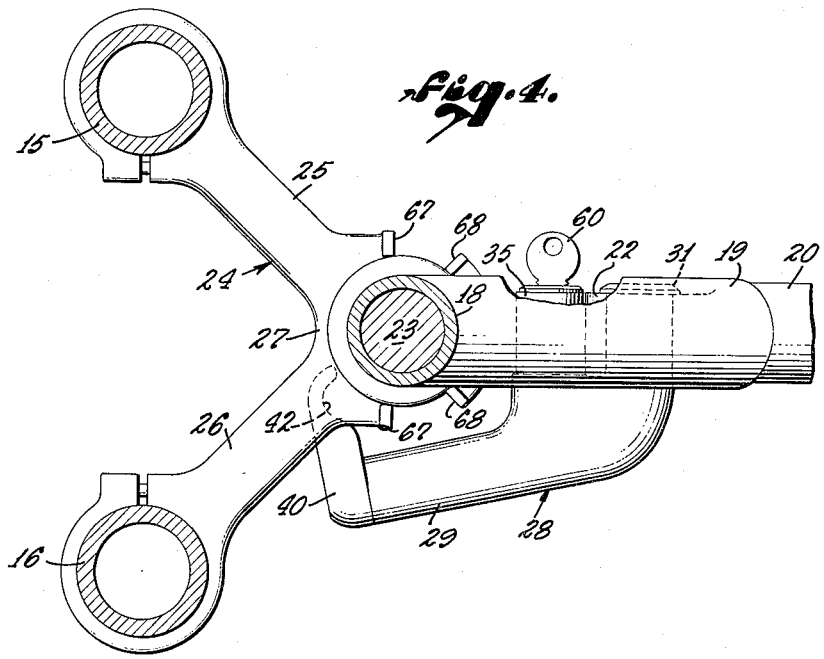
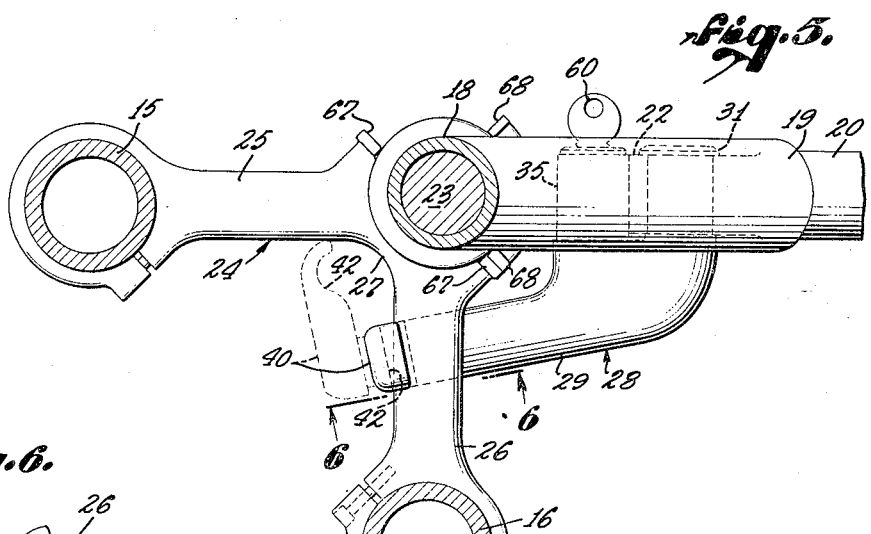
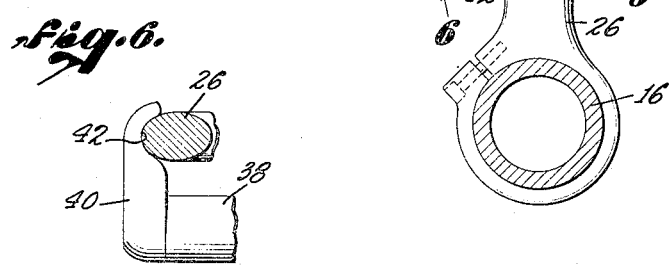
INVENTOR:
LLOYD E. HINDS.
BY George V. Smyth
ATTORNEY.

Jan. 20, 1953 L. E. HINDS 2,625,813
MOTORCYCLE LOCK
Filed Nov. 22, 1950 3 Sheets-Sheet 3
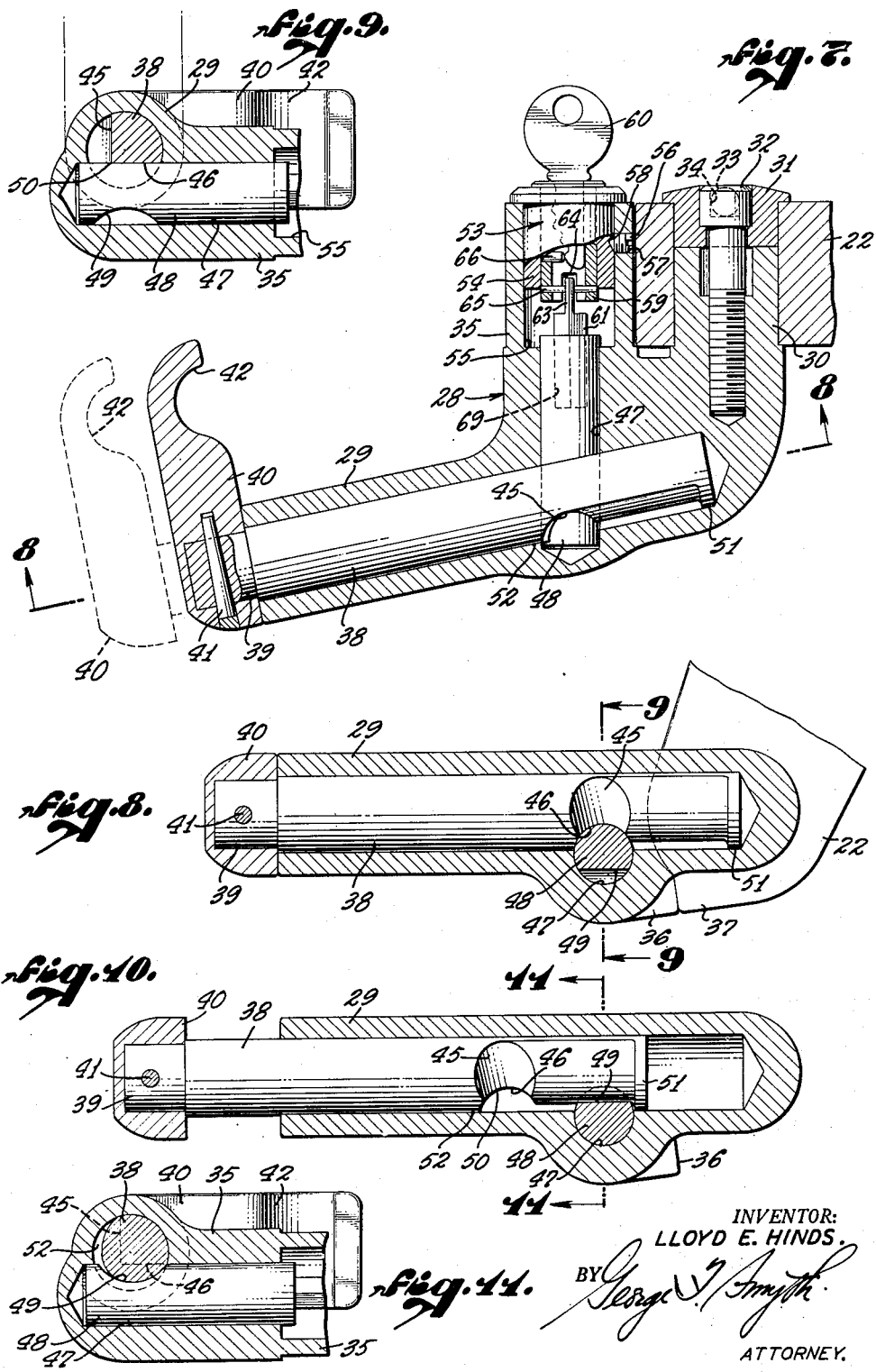
INVENTOR:
LLOYD E. HINDS.
BY George W. Smyth
ATTORNEY.

Patented Jan. 20, 1953

2,625,813

UNITED STATES PATENT OFFICE 2,625,813

MOTORCYCLE LOCK

Lloyd E. Hinds, Los Angeles, Calif.

Application November 22, 1950, Serial No. 197,009

8 Claims. (Cl. 70—185)

1

This invention relates to motorcycle locks and particularly to such a lock which is adapted to be permanently mounted to the frame of the motorcycle.

The lock of the present invention is designed particularly for use with present day light weight motorcycles, which are not supplied with a locking device other than the usual ignition lock. Such motorcycles today are usually locked by the user by threading a link chain through the spokes of one wheel and around a frame member after which the opposite ends of the chain are secured by a conventional padlock. This type of lock is objectionable to many cyclists as it requires a storage compartment when not in use. Many light weight motorcycles present no means for storing such a lock and consequently the cyclist is required to carry the same in a pocket of his clothing.

The lock of the present invention is specifically designed for permanent attachment to motorcycles which are provided with an apertured lug on the frame adjacent the steering head to which lug the front brace bar of a side car may be secured. Several popular makes of motorcycles are fitted with such apertured lugs and as side cars are used very little today particularly in the United States, these lugs are thus available as an attaching means for the lock of the present invention.

The lock of the present invention, in the broadest aspects thereof, comprises a claw-like element adapted to be moved into engagement with one of the frame members forming a part of the front fork assembly of the cycle. This claw-like element can be locked against movement once it is engaged with the frame element to prevent normal movement of the front fork assembly.

A further feature of the lock of the present invention resides in the fact that the claw element is also locked in an inoperative position in which it does not interfere with the normal movement of the front fork assembly. As the claw element is locked in its inoperative position, there is no danger of the claw element accidentally moving into a position in which it will interfere with the movement of the front fork assembly.

The lock of the present invention once mounted to the frame of the motorcycle cannot be removed therefrom except by the use of metal cutting tools, the use of which would call attention to the fact that the tool user was attempting to surreptitiously remove the lock from the motorcycle.

2

Other features and advantages of the present invention will be hereinafter apparent from the following description, particularly when taken in connection with the accompanying drawing, in which:

Figure 1 is a fragmentary perspective view of the steering head and front fork assembly of a motorcycle fitted with the lock of my invention, the forks being shown in riding position with the lock in inoperative position;

Figure 2 is a view similar to Figure 1, but with the front forks turned at a sharp angle to the longitudinal axis of the machine as when parked, with the lock in operative position;

Figure 3 is a fragmentary side view, drawn on a larger scale showing the lock and adjacent parts in the position shown in Figure 1;

Figure 4 is a section taken on line 4—4 of Figure 3 and thus shows the lock in inoperative position;

Figure 5 is a cross section on the same line as Figure 4, but showing the front forks turned into the parking position and the lock in operative position;

Figure 6 is a fragmentary cross section on the line 6—6 of Figure 5;

Figure 7 is a horizontal cross section on the median plane of the lock, the view being drawn on a still larger scale;

Figure 8 is a section taken along line 8—8 of Figure 7, showing the parts locked in inoperative position.

Figure 9 is a cross section on the line 9—9 of Figure 8, parts being broken to show parts otherwise obscured;

Figure 10 is a view similar to Figure 8, but with the parts freed preparatory to putting the lock in operative position; and Figure 11 is a section taken along line 11—11 of Figure 10.

In the drawing, the numerals 15 and 16 indicate the right and left hand front forks respectively of a motorcycle, the handlebars being indicated at 17, the steering head at 18, the latter being formed with a downwardly angled socket 19 into which the upper end of the front down tube 20 of the motorcycle frame is fitted, and the front wheel at 21.

An apertured lug 22 is provided on many makes of motorcycles which can be used for securing the front brace bar of a side car attachment to the frame of the motorcycle, the lug being welded to the socket 19 on the median line of the motorcycle frame and projecting below the lower end of the steering head 18.

In a typical front fork assembly such as shown in the drawings, the front forks are rigidly connected to the lower end of the steering column 23, rotatably mounted within the steering head 18, by a V-shaped connecting strut or member 24. This connecting member, as best seen in Figure 4, is formed with an arm 25 secured to the right hand fork 15 and an arm 26 secured to the left hand fork 16. Arms 25 and 26 diverge from a central portion 27 which is secured to the lower end of the steering column 23 in any suitable manner. Turn limiting stops are usually provided on members 27 and 18 to prevent damage to the gasoline storage tank of the cycle.

The lock of my invention comprises a housing 28 which may be formed as a casting, shaped to provide a first tubular portion 29 having a laterally projecting stub or lug 30 at one end which is machined to fit snugly into the aperture in lug 22. The lock is shown mounted to the left side of the motorcycle and the stub 30 is held in the apertured lug by a cap piece 31 bearing against the opposite face of lug 22 and secured by a cap stud 32 threadedly engaged in a tapped bore formed in the end face of the stub 30. To prevent removal of the lock after it has been installed, a steel ball 33 may be driven into the wrench socket 34 in the head of the cap stud 32.

The housing 28 is also formed to provide a second tubular portion 35 projecting laterally from the first tubular portion, the bores of the first and second tubular portions intersecting one another. An abutment 36, referring now to Figure 8, is provided projecting laterally from tubular portion 35 and is adapted to abut a shoulder 37 projecting from lug 22, the engagement of the abutment and shoulder ensuring that the tubular portion 29 is maintained in a plane substantially parallel to that of the arms of the V-shaped member 24.

A cylindrical rod 38, referring now to Figure 7, is slidably and rotatably fitted in the bore of the tubular portion 29 of the housing 28, the rod 38 being of such a length that the one end thereof projects outwardly beyond the outer end of the tubular portion 29. The projecting end of the rod 38 is reduced in diameter to form a finger 39 to which is mounted a claw element 40. This element is formed with a blind bore receiving the finger 39, the latter being held against removal by a shear-resisting pin 41. Preferably the claw 40 is provided with a hooked end 42 shaped to fit around one or the other of the arms 25 or 26 depending on which side of the motorcycle the lock is mounted.

The claw 40, as the lock is shown mounted to the left side of the lug 22, is intended to lockingly engage with the arm 26 and this locking engagement is brought about by turning the front fork to the left to position the front wheel 21 of the motorcyle at a relatively sharp angle to the longitudinal axis of the motorcycle. The claw is then pulled outwardly and after the claw has moved beyond the arm 26, the claw and the rod 38 is then rotated substantially 90°, after which the rod 38 is slidably moved to position the claw 40 in the position shown in Figure 6. By now locking the rod 38 against movement, the claw will effectively prevent return movement of the steerable wheel of the motorcycle to a position in which the motorcycle can be ridden or pushed.

Although any means desired may be used to lock or hold the rod 38 against movement, in the now preferred embodiment of the present invention, retaining recesses 45 and 46, as best seen in Figure 9, are formed in the surface of the rod 38 about a common circumferential line. Although the bores of the tubular portions 29 and 35 intersect, it will be seen that the axes of the bores are offset with respect to one another. The faces of the recesses 45 and 46 extend substantially at right angles to one another and in the illustrated embodiment of the invention are of arcuate form and shaped to receive a cylindrical locking rod 48 rotatably mounted in the bore 47.

Reception of an aligned portion of the rod 48 in either recess 45 or 46 will effectively prevent rotational as well as longitudinal movement of the rod 38. To permit rotational movement of the rod 38, a cylindrical recess 49 is formed in the rod 48, which recess is large enough to permit the recessed shoulder 50, formed by the intersection of the faces of the recesses 45 and 46, to arcuately move through the recess 49 when the rod 48 is rotationally moved to bring the recess 49 thereof into alignment with the shoulder 50.

It will be seen, referring now to Figure 8, that when the rod 38 is in the position there shown, that is, retracted within the tubular element 29 and the cylindrical surface of the rod 48 is engaged in the recess 46, the rod 38 will be locked against longitudinal as well as rotational movement. In this relative position of the parts, the lock of the present invention is in its inoperative position as shown in Figure 1.

When it is desired to move the claw element 40 into its operative position, the rod 48 may be rotated to move the recess 49 thereof into registry with the recess 46. In this relative position of the parts, the rod 38, as above explained, can be rotated to move the claw into a vertical or operative position. In this relative position of the two rods, the recess 45 is now registering with the recess 49 and by rotating the rod 48 to move the cylindrical surface of that rod into the recess 45, the rod 38 will again be held against rotational movement.

If a straight finger were to be used in place of the claw 40, the configuration of the rod 38 and 48 so far described would be sufficient, but as I prefer to use the hooked claw shown, provision must be made to enable the rod 38 to be moved axially outwardly to enable the tip of the hook to clear the arm 25 or 26 engaged by it. The rod 38 is therefore flattened along the one side thereof and between the inward edges of the retaining recesses and the collar-like end 51 of the rod 38. Thus, when recess 49 is aligned with the flattened portion, the rod 38 may be longitudinally moved a distance equal to the distance between the full diameter portion of rod 38 indicated at 52, and the collar 51. It will be noted that the full diameter areas at 51 and 52 act as stops limiting the length of axial movement of rod 38.

It should now be understood that with the lock in its inoperative position, that is, with the claw element disposed substantially horizontal and beneath the connecting member 24, the rod 48 can be rotated to bring the recess 49 thereof into registry with the recess 46 of the rod 38. This movement of the rod 38 also brings the flattened portion thereof into registry with the recess 49 and the rod 38 may now be moved longitudinally of the tubular member 29 to the position shown in Figure 10. After the rod 38 has been rotated to dispose claw 40 in a substantially vertical position, the rod 38 is moved longitudinally of the tubular member 29 to bring the claw into engagement with the arm 26 as shown in Figure 5. The rod 48 is thereafter rotated to bring the full cylindrical surface thereof diametrically opposite the recess 49 into the recess 45. As above explained the rod 38 is now held against longitudinal as well as rotational movement and the claw 40 will prevent the front fork assembly of the cycle from being moved into a normal running position.

The locking rod 48 is preferably rotated by means of a lock assembly 53, referring again to Figure 7, the housing 54 of which is secured in the outer end of an enlargement 55 of the bore of the tubular member 35. Although any means desired can be used to secure the housing 54 in the embodiment shown, the housing is secured by a set screw 56 mounted in a tapped opening 57 formed in the wall of the tubular member 35 and engaging in a recess 58 provided in the lock housing. It will be seen that the set screw 56, once the lock is installed on a motorcycle, is inaccessible and therefore cannot be removed without first removing the lock from the apertured lug 22.

The lock assembly 53 may comprise any suitable lock mechanism but in the form illustrated this assembly is of the tumbler type and key operated to release a key-receiving barrel 59 of the assembly for rotational movement.

The rotation of the barrel 59 of the lock assembly is brought about by a key 60 as in conventional lock practice. This rotation of the barrel 59 is transmitted to the locking rod 48 by a length of square rod 61 fitted at one end into a square opening 69 broached or otherwise formed in the end face of the rod 48. The opposite end of the rod 61 is flattened at 63 and the flattened end fitted into a slot 64 formed in the inner end of the barrel 59. A shear-resisting pin 65 retains the flattened end 63 in the slot 64.

It should thus be understood that with the key 60 inserted into the barrel 59 the barrel will be free to rotatably move with the key, and this rotational movement is transmitted to the locking rod 48 to bring about the operation previously explained hereinabove. Once, however, the key 60 is removed from the barrel, the tumblers thereof will move radially inward to positively hold the barrel 59 and consequently the locking rod 48 against rotational movement.

To now explain completely the operation of the lock of the present invention, with the key 60 mounted in the barrel 59, the locking rod 48 may be rotatably moved 180° from the position shown in Figure 8. With the recess 49 of the locking rod 48 registering with the recess 46 of the rod 38, the latter may be longitudinally moved outwardly until the collar 51 engages with the rod 48. The tubular portion 29 diverges somewhat from the longitudinal axes of the motorcycle and is of such a length that when the front wheel is turned sharply to the left, as shown in Figure 5, to bring the left limit stop 67 into engagement with the left stop shoulder 68 on the bottom of the steering head 18, the extended rod 38 disposes claw 40 beyond or forwardly of the arm 26. The claw 40 can now be rotated substantially 90° into a somewhat vertical position after which mounting rod 38 can be moved into the tubular member 29 to bring the claw 40 into engagement with the arm 26. The key 60 of the lock assembly 53 is now rotated 180° and then withdrawn which, as will be understood locks the barrel 59 against rotational movement to thus hold the locking rod 48 against rotational movement. The claw 40 is thus held against movement and will prevent through interference with the arm 26, movement of the front fork assembly into a position in which the motorcycle can be ridden or conveniently pushed.

The lock of the present invention is extremely rugged and because of the particular construction employed is practically impossible to remove from the motorcycle once it has been installed, even by impact blows such as might be struck by a hammer or like tool. As all means used to mount the lock to the motorcycle are practically inaccessible after the lock has once been installed, there is little likelihood that the lock will be removed surreptitiously from the motorcycle. It will thus be seen that the present invention provides a very sturdy lock which once mounted into position on the motorcycle, cannot be removed without employing metal cutting tools, the use of which would call attention to the fact that someone was attempting to surreptitiously remove the lock from the motorcycle.

As the claw 40 can be locked in its inoperative position, as shown in Figure 1, there is no danger of the claw inadvertently moving into its vertical position in which it would interfere with the normal steering movements of the front fork assembly. It should be obvious now that to lock the claw element in its inoperative position, the rod 38 need only be moved to its retracted position within the tubular member 29 and then rotated to move the claw into a substantially horizontal position after which the locking rod 48 is moved into the position shown in the Figure 8. The reception of the unrecessed portion of the rod in the recess 46 of the rod 38 will positively hold this rod against longitudinal as well as rotational movement.

Although the lock of the present invention is particularly adapted to be used with motorcycles having a side car attaching lug, such as indicated at 22, it is obvious that all of the advantages of the present invention could be had with motorcycles not provided with this lug by merely supplying with the lock a clamp device presenting an apertured lug similar to the one indicated at 22. Thus by clampingly mounting an apertured lug to the down-tube of the motorcycle frame the lock of the present invention could be mounted in exactly the same way as it is mounted in the integral lug illustrated in the drawing.

Although the now preferred embodiment of the present invention has been shown and described herein, it is to be understood that the invention is not to be limited thereto, for it is susceptible to changes in form and detail within the scope of the appended claims.

I claim:

1. A lock for a motorcycle provided with an apertured lug mounted on the frame closely adjacent and behind the lower end of the steering column, comprising: a lock housing adapted to be secured at one end to the lug; a first tubular portion of said housing projecting forwardly from the secured end thereof; a second tubular portion of said housing projecting at an angle to the said first tubular portion, the walls of the bores of said tubular portions partially intersecting one another; a rod rotatably mounted in said first tubular portion of the housing; a claw fixed to the forward end of said rod beyond the forward end of the first tubular housing portion, said rod being formed adjacent the inner end thereof with a pair of recesses; a locking rod rotatably mounted in the second tubular portion and being formed adjacent the inner end thereof with at least one recess substantially aligned with the bore of said first tubular member, the unrecessed surface of said locking rod shaped to engage with one or the other of the recesses of said first mentioned rod to hold the same against rotational and longitudinal movement; and means operatively connected to said locking rod to rotate the same to move the recess thereof into registry with one or the other of the recesses of said first mentioned rod to free the latter for rotational movement; said first mentioned rod being formed with a longitudinally extending cutaway portion contiguous to the recesses formed therein which portion, when said locking rod is moved to position the recess thereof in registry with one or the other of the recesses of said first mentioned rod, frees the latter for longitudinal movement.

2. A lock for a motorcycle provided with an apertured lug mounted on the frame closely adjacent and behind the lower end of the steering column to which the front fork assembly of the motorcycle is mounted, comprising: a lock housing adapted to be secured at one end to the lug; a first tubular member of said housing projecting forwardly from the secured end thereof; a second tubular member of said housing projecting at an angle to the said first tubular member, the walls of the bores of said tubular members partially intersecting one another; a rod rotatably mounted in said first tubular portion; a claw fixed to the forward end of said rod beyond the forward end of the first tubular member; said rod being formed adjacent the inner end thereof with a pair of recesses; a locking rod rotatably mounted in the second tubular member and being formed adjacent the inner end thereof with at least one recess substantially aligned with the bore of said first tubular member, said locking rod shaped to engage with one or the other of the recesses of said first mentioned rod to hold the same against rotational movement; and means operatively connected to said locking rod to rotate the same to move the recess thereof into registry with one or the other of the recesses of said first mentioned rod to free the latter for rotational movement; rotational movement of said first rod moving said claw from an inoperative position to an operative position in which said claw engages the front fork assembly of said motorcycle to hold the same against movement.

3. A lock for a motorcycle provided with an apertured lug on the frame thereof closely adjacent and behind the lower end of the steering column to which the front fork assembly of the motorcycle is mounted, comprising: a lock housing adapted to be secured in said lug; a first tubular member of said housing projecting forwardly from the secured end thereof; a second tubular member laterally projecting from said first member, the walls of the bores of said tubular members partially intersecting one another; a rod mounted for rotational and axial movement in the bore of said first member; means confining rotational movement of said last named rod to movement between alternate positions relative to said second member; a rod rotatably mounted in the bore of said second member, the rods being so cut away in the intersecting portions thereof that said first rod is interlockingly engaged with said second rod when the latter is moved to one of said alternate positions relative to said second tubular member and free to rotate when said second rod is moved into the other of said alternate positions; a claw fixed to the outer end of said first rod, said claw being rotatable with said first rod into a position in which, when the front fork assembly is moved to position the front wheel of the motorcycle at an angle to the longitudinal axes of the same, the same holds said assembly against movement and prevents return of said wheel to its normal running position; means carried within said second tubular member for rotating said second rod between said alternate positions; and means for locking said rotating means against movement.

4. A lock for a motorcycle provided with an apertured lug on the frame thereof closely adjacent and behind the lower end of the steering column to which the front fork assembly of the motorcycle is mounted comprising: a lock housing adapted to be secured in said lug; a first tubular member of said housing projecting forwardly from the secured end thereof; a second tubular member laterally projecting from said first member, the walls of the bores of said tubular members partially intersecting one another; a rod rotatably mounted in the bore of said first member; a rod mounted in the bore of said second member for rotational movement between predetermined alternate positions relative thereto, the rods being so cut away in the intersecting portions thereof that said first rod is interlockingly engaged with said second rod when the latter is moved to one of said alternate positions relative to said second tubular member and free to rotate when said second rod is moved into the other of said alternate positions; and a claw fixed to the outer end of said first rod, said claw being rotatable with said first rod into a position in which, when the front fork assembly is moved to position the front wheel of the motorcycle at an angle to the longitudinal axes of the same, the same holds said assembly against movement and prevents return of said wheel to its normal running position.

5. A lock for a motorcycle provided with an apertured lug mounted on the frame closely adjacent and behind the lower end of the steering column, comprising: a lock housing adapted to be secured at one end to the lug; a first tubular member of said housing projecting forwardly from the secured end thereof; a second tubular member of said housing projecting at an angle to the said first tubular member, the bores of said tubular member being offset from one another a distance less than the diameter whereby said bores partially intersect one another; a rod movably mounted in said first member of the housing; a retaining claw located at the forward end of said rod beyond the forward end of the first member; said rod having recesses formed in the periphery thereof adjacent the inner end thereof; a locking rod rotatably mounted in the second tubular member of the housing and having a recess in the periphery thereof; said locking rod rotatable to position the recess therein in alignment with the retaining recesses of the first mentioned rod to permit movement thereof at times and at other times to position a portion of said locking rod within said recesses of the first mentioned rod to prevent movement of the latter; and lockable means operatively connected to said locking rod and operable to free the first mentioned rod to enable the claw mounted thereon to be at times engaged with, and at other times freed from, the front forks of the motorcycle when turned at an angle to the longitudinal axis of the motorcycle, and retained in either position by said lockable means.

6. A lock for a motorcycle provided with an apertured lug mounted on the frame closely adjacent and behind the lower end of the steering column, comprising: a lock housing adapted to be secured at one end to the lug, a first tubular portion of said housing projecting forwardly from the secured end thereof; a second tubular portion of said housing projecting at an angle to the said first tubular portion with the walls of the bores of said tubular portions partially intersecting one another; a cylindrical rod mounted for rotational and axial movement in the fore of said first tubular portion of the housing; a retaining claw located at the forward end of said rod beyond the forward end of the first tubular housing portion, said rod having circumferentially aligned recesses formed at an angle to one another in the periphery thereof and movable by rotational and axial movement of said rod into alignment with the bore of the second tubular housing portion, said rod being flattened between said recesses and the inner end of the rod; a cylindrical locking rod rotatably mounted in the second tubular portion of the housing and recessed on one side so that said locking rod is effective to hold the first mentioned rod against movement when the cylindrical surface of the locking rod is engaged with either of the recesses in the first mentioned rod, and enables the first mentioned rod to be rotated and moved axially when the recess in the locking rod is aligned with the recesses in the first mentioned rod; and lockable means operatively connected to said locking rod and operable to free the first mentioned rod to enable the retaining finger located thereon to be at times engaged with, and at other times freed from, the front forks of the motorcycle when turned at an angle to the longitudinal axis of the motorcycle, and retained in either position by said lockable means.

7. A lock construction for motorcycles, comprising: an aperture lug adapted to be clampingly mounted on the frame of the motorcycle behind and below and adjacent to the lower end of the steering column to which the front fork assembly of the motorcycle is connected; a lock housing adapted to be secured at one end to the lug; a first tubular portion of said housing projecting forwardly from the secured end thereof; a second tubular portion of said housing projecting at an angle to the said first tubular portion with the walls of the bores of said tubular portions intersecting one another; a rod movably mounted in said first tubular portion of the housing; a retaining claw located at the forward end of said rod beyond the forward end of the first tubular housing portion; said rod having retaining recesses formed in the periphery thereof toward the inner end of the same; a locking rod rotatably mounted in the second tubular portion of the housing and shaped to engage with the retaining recesses of the first mentioned rod; and lockable means operatively connected to said locking rod and operable to free the first mentioned rod to enable the retaining finger located thereon to be at times engaged with, and at other times freed from, the front forks of the motorcycle when turned at an angle to the longitudinal axis of the motorcycle, and retained in either position by said lockable means.

8. A lock construction for a motorcycle provided with an apertured lug on the frame thereof and having the front fork connected to the lower end of the steering column by a member having diverging arms, comprising: a lock housing; a laterally projected stub carried at one end of said housing and adapted to be telescopically mounted in said apertured lug; means engageable with said stub for clampingly mounting said stub to said lug; a claw; means for mounting said claw for longitudinal and rotational movement relative to said housing; means for limiting rotational movement of said claw mounting means between predetermined alternate positions relative to said housing; and means for releasably locking said mounting means in either of said alternate positions, said claw in one of said positions being horizontally disposed underneath the said diverging arms and in the other of said positions being vertically disposed and engageable with one of said diverging arms when the front fork is turned at an acute angle to the longitudinal axis of the frame to hold said front forks against movement to its normal running position relative to the frame.

LLOYD E. HINDS.

REFERENCES CITED

The following references are of record in the file of this patent:

UNITED STATES PATENTS

| Number | Name | Date |
| --- | --- | --- |
| 1,262,185 | Drew | Apr. 9, 1918 |
| 2,468,406 | Mora | Apr. 26, 1949 |